RONALD A. MUNIER
FRANCIS J. McGOWAN
INVENTORS

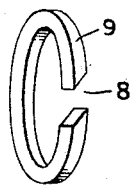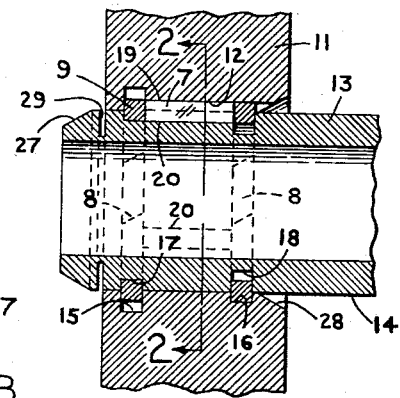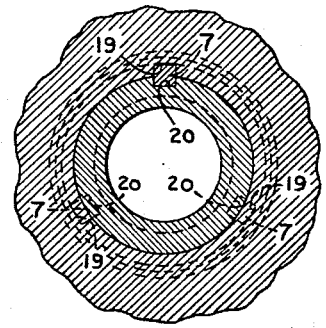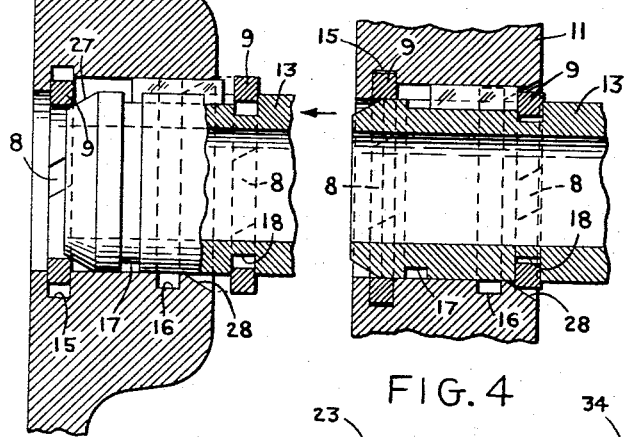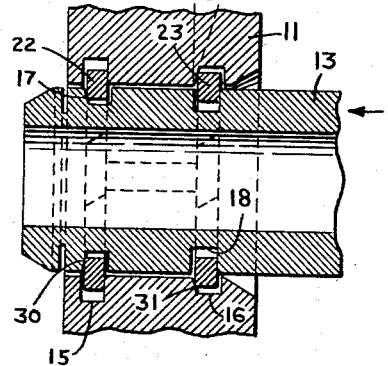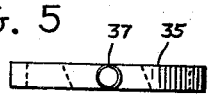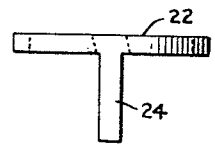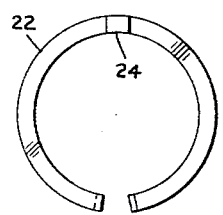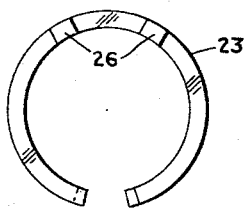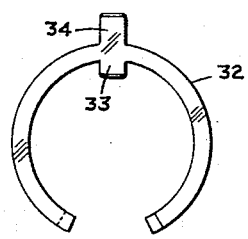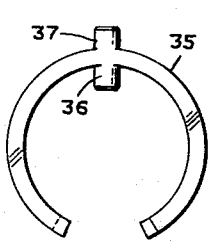
RONALD A. MUNIER
FRANCIS J. McGOWAN
INVENTORS June 20, 1967 R. A. MUNIER ETAL 3,326,580
LOCKING ASSEMBLY HAVING MEANS TO PREVENT
AXIAL AND TORSIONAL MOVEMENT
Filed Jan. 7, 1965 2 Sheets-Sheet 2

BY Daniel H. Bobis
Atty

United States Patent Office 3,326,580
Patented June 20, 1967

3,326,580
LOCKING ASSEMBLY HAVING MEANS TO PREVENT AXIAL AND TORSIONAL MOVEMENT
Ronald A. Munier, Elizabeth, and Francis J. McGowan, Murray Hill, N.J., assignors to Worthington Corporation, Harrison, N.J., a corporation of Delaware
Filed Jan. 7, 1965, Ser. No. 424,090
1 Claim. (Cl. 285—27)

ABSTRACT OF THE DISCLOSURE

An apparatus for interlocking an externally grooved cylindrical member within an internally grooved cylindrical member in which said grooved surfaces are cooperatively associated and shaped so as to accommodate snap-ring locking means and a locking key so as to rigidly lock both members together so that both axial and torsional movement between said members is completely eliminated.

---

This invention relates generally to locking parts together, and particularly to a lock to connect an externally cylindrical member in an internally cylindrical passage.

More particularly, this invention relates to a snap-ring lock used to attach a seal, bushing, a sleeve, a shaft, or the like in a passage in a plate or other object; the parts do not rotate with respect to each other.

It is an object of this invention to provide ease of assembly of an externally cylindrical non-rotating object in an internally cylindrical passage.

Another object of this invention is to provide cooperative keyways in an externally cylindrical object and in an internally cylindrical passage, for receiving an anti-torsional locking key.

Another object of this invention is to provide opposing annular grooves on an externally cylindrical object and also in an internally cylindrical passage, each to receive a portion of a locking member and to position it in the axial passage.

A still further object of the invention is to provide a lock for such members which substantially eliminates axial play.

A still further object of the invention is to provide a lock for an externally cylindrical object that will fix it in an internally cylindrical passage with minimum clearance.

Yet another object of the invention to provide a lock for such members which prevents torsional or axial movement.

A still further object of the invention is to attach such members together, without press fitting, bolting, welding, pinning, swagging, rolling, or shrink fitting.

An yet another object of the invention is to obviate stress in either piece, at the points of contact with the locking members.

Yet another object of the invention is to attach shafts together.

Yet still another object is to attach members together to resist axial and torsional impacts.

Yet another object of the invention is to attach parts together by sliding them into a connected state.

Among the still further objects of the invention is to provide a lock wherein the lock member has a large external engaging surface with respect to the parts to be locked together, to distribute both torsional and axial impact forces over the largest possible area.

When an externally cylindrical nonrotating object is to be attached to another object having an internally cylindrical passage in that object, with a minimum of clearance, and to be locked therein, attachment by press fitting, bolting, welding, pinning, swagging, rolling, or shrink fitting, may be difficult, inefficient, lacking stability and permanence, uneconomical, or cause stresses which impair the durability of the parts.

It has been discovered that an externally cylindrical, nonrotating member, and a member having an internally cylindrical passage, may each be provided with an annular radial groove and an axial groove or grooves, cooperatively arranged to receive a lock which will attach the members together with a minimum of clearance. Such a lock, in one embodiment of the invention, consists of a key disposed in opposed axial passages on both of the members, and a snap ring disposed in annular grooves on the members.

It is known that members (pipes) may be locked together against axial forces (but not rotating forces) by snap-rings in cooperation with annular grooves. The present lock is generally of this character, but is effective against both axial and torsional forces. The basic form may be added to, to accomplish a relatively more rigid, play-free joint. A preferred embodiment of the lock is in the form of a pair of spring rings in a pair of radially, oppositely located, grooves. In an improved species of lock, the grooves may each be provided with one diagonally inclined side wall urging the rings to seat at the narrowest portion of the groove and thus provide even greater axial rigidity. Such constructions are but one of numerous embodiments of the invention.

The objects hereinbefore set forth and the advantages attained by the present invention as well as other objects and advantages which may be attained by this invention may be attained by the device shown merely to illustrate the inventive concept in the accompanying drawings in which:

FIGURE 1 is a vertical sectional view of a completely assembled locking device comprising two snap-rings and three separate keys applied to a tubular member and a plate;

FIGURE 1A is a perspective view of the snap-ring of FIGURE 1;

FIGURE 1B is a perspective view of the key of FIGURE 1;

FIGURE 2 is a cross-sectional view taken on the line 2—2 looking in the direction of the arrows, in FIGURE 1;

FIGURE 3 is a sectional view as in FIGURE 1, showing an early stage assembly;

FIGURE 4 is a sectional view as in FIGURE 3 showing a further advanced state of assembly;

FIGURE 5 is a sectional view of another example of a locking device, embodying inclined walls in the snap-ring grooves.

FIGURE 6 is a side elevational view of one species of a combined snap-ring and torsional locking key;

FIGURE 7 is a top plan view of the device shown in FIGURE 6;

FIGURE 8 is a side elevational view of a combined double key and lock ring;

FIGURE 9 is a top plan view of the device shown in FIGURE 8;

FIGURE 10 is a top plan view of a locking device having internal and externally rectangular anti-torsional radial key elements;

FIGURE 11 is a side elevational view of the device shown in FIGURE 10;

FIGURE 12 is a top plan view of a locking means having internal and external circular anti-torsional radial key elements;

FIGURE 13 is a side elevational view of the device shown in FIGURE 12;

Figure 23:
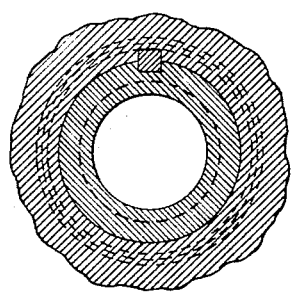
FIGURE 23 is a cross-sectional view of a species of the invention shown in FIGURE 2 except for the use of only a single key.

Referring now to the drawings in detail and directing attention first to FIGURE 1, embodying a simple species of the invention, there is shown an outer part 11 with a bore or passage 12 extending therethrough in a general perpendicularity to its surface. A shaft or bushing 13, having a cylindrical external surface 14 has been inserted within the outer part 11 which is provided with a pair of annular concentric grooves 15, 16. The bushing 13 is provided with a pair of concentric, annular, opposite grooves 17, 18. The one groove 15 in the outer part 11, and the one groove 18 in the inner part or bushing 13 are made deep enough to accommodate completely the snap-rings or cooperative annular connectors hereinafter referred to. On the other hand groove 17 in the bushing and groove 16 in the outer part 11 are machined only sufficiently deep to accommodate approximately ½ the radial width of the snap-ring connecting members hereinafter referred to. The grooves 17, 18 which are annular are intersected by axial keyways 19, 19, 19. The bushing 13 is provided with corresponding axial keyways 20, 20, 20. Unlike the annular grooves the axial keyways are machined into both the plate and the bushing to a depth equal to only one half of the depth of the key. Although FIGURES 1 and 2 and 3 show a form of the invention having three keys 19 etc. for ultra rigid torsional locking, it is to be understood that one key, as shown in FIGURE 23, is sufficient.

A pair of resilient snap-rings 9, 9 are used in this species of this locking device. The snap-rings 9 have a gap 8, and an axial key 7 is provided.

In FIGURE 3, a snap ring 9 has been placed in the annular groove 15. The other snap-ring 9 has been placed in the annular groove in the bushing. The keys 7, 7, 7 have been arranged in registration with the corresponding opposite cooperative portions of the keyways 19, 20, 19, 20, etc. The leading edge 27 of the bushing 13 is conical so that when the first snap ring 9 encounters this conical portion 27, it is spread under the influence of the advancing bushing 13 which is moving in the direction of the arrow in FIGURE 3. Similarly, the second snap-ring 9 encounters a taper 28 or conical portion on the outer part 11, thereby compressing the snap-ring 9 into the groove 18 of the bushing. The second snap-ring 9, encounters the axial keys 7, etc., and slides them along the keyways 19, 20. The keys 7, etc., and the keyways 19, 20 are in general parallelism with the axis of the shaft or bushing 13, i.e. coaxially, in order to prevent binding during assembly.

FIGURE 4 shows the progressive advancement of the bushing 13 wherein the first snap-ring has been expanded to completely fill the groove 15 in the outer part 11.

Second snap-ring 9 is nearly fully compressed by the taper 28 whereby it will soon completely fill the groove 18 in the bushing 13. Complete registration of the co-operative opposite grooves 15, 17, 16, 18 has not been quite achieved until the degree of advance depicted in FIGURE 1 has been attained, when the first snap-ring 9 is no longer restrained, and returns substantially to its original unexpanded diameter while seating itself in the groove 17. Since groove 17 in the bushing 13 is only half the radial depth of the snap-ring 9, the snap-ring 9 now obstructs further axial movement of the bushing 13 with respect to the outer part 11. Similarly, the second snap-ring 9 being relieved of the compressive force of the taper 28, expands into the groove 16 in the outer part 11. Each of the keys, 7, etc., fill the cooperative opposite axial pairs of key ways 19, 20 etc., and the outer part 11 and the bushing 13 are engaged together against torsional movement, while the snap-rings lock axial movement (see FIGURE 1). The lock is permanent. If the conical end 27 is not to be retained after the parts are assembled, the end of the bushing 13 may be provided with an annular cut 29, and this cut 29 may be cut through to separate the conical end, leaving a smooth face on the outer part 11 without the bushing 13 protruding. In this type of connection, a small amount of axial play is present. If such axial play, however, is not admissable, it may be substantially reduced.

Referring to FIGURE 5, it is found that if the flank 30 of groove 17 is radially inclined and the inclination dimensioned to provide the largest axial width of the groove 17 at its entry point in the bushing 13, and if the flank 31 of the groove 16 is also radially inclined to provide the largest axial width of the groove 16 at its entry point in the outer part 11, axial play is substantially eliminated. When FIGURE 5 is regarded and it is considered that the advancement of the bushing in the direction of the arrow has caused the snap-ring 22 to be expanded, it will be seen that when the ring 22 snaps into place, it will encounter the flank 30 and thereby will tend to urge the first snap-ring 22 toward the bottom of the groove 17 as it contracts to its normal diameter. On the other hand, it will be seen that the second snap-ring 23 has been compressed, but when it snaps into the groove 16, it will encounter the flank 31 and will tend to urge the second snap-ring 23 toward the bottom of the groove 16 as the ring 23 expands. The seating of the snap rings 22, 23, by sliding on the flanks 30, 31 to the narrowest portion of the grooves 16, 17, will substantially eliminate play in an axial direction, since the floor of the groove 16, 17 is substantially the precise width of the rings 22, 23. The angular divergence of the side walls of the channels defined by the flanks 30, 31 must be equal or smaller than the angle of repose for static friction of the materials used for the spring rings and for the outer part 11 and the bushing 13. Thus, if the coefficient of friction "$f$" is, for example, $0.1 = \tan x$, then the angle $\theta$ can be equal or greater than 6° to prevent self unlocking. (See FIGURE 5.)

There has been referred to in the foregoing description the union of an outer part 11 in the form of a plate and a bushing 13. These forms, to be united, have merely been referred to for illustrative purposes as it is obvious that numerous other shapes might be interconnected by the same means.

It is noted that FIGURES 1, 2, 3 and 4 show snap-rings 9 separate. A snap-ring 22 having a single unitary key 24 (see FIGURES 6 and 7) could be combined as well with snap-ring 23 (see FIGURES 8 and 9) having unitary double keys 26, 26 or greatly increased number of multiple keys, could be combined. (See FIGURE 14.) The multiple key arrangements are most suitable for resisting higher torsional forces.

Another species of snap ring is shown in FIGURES 10 and 11. Here the snap-ring 32 is provided with an internal key 33 and an external key 34. These keys have a generally rectangular configuration. In FIGURES 12 and 13, snap-ring 35 is provided with an internal radial key 36 and an external radial key 37. The keys 36, 37 are generally cylindrical. It will therefore be seen that the axial keyways 19 and 20 may be dimensioned to accommodate integral radial keys 33, 34, 36, 37. Snap-rings 32 and 35 are suitable if subjected only to small torsional impacts.

Figure 14:
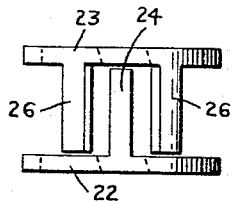
FIGURE 14 is a top view of combined snap-ring and key locking means, one having a single key and the other having a pair of keys disposed on either side of the other key.
Figure 15:
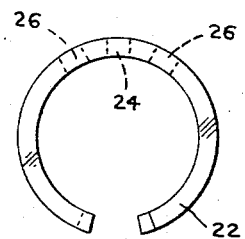
FIGURE 15 is a side elevational view of the pair of locking devices shown in FIGURE 14.

FIGURES 14 and 15 show means for uniting members, where the member having an internal concave passage which is relatively thin. The combination shown of a single key snap-ring and a double key ring.

Figure 22:
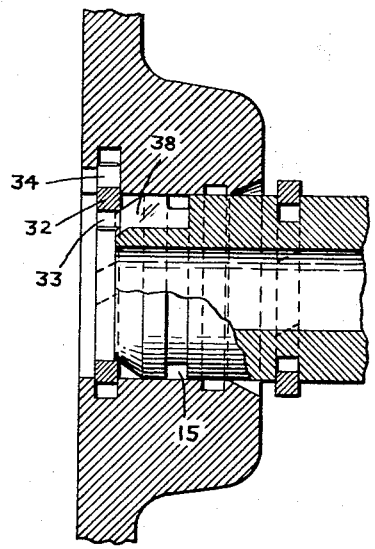
FIGURE 22 shows a locking device similar to FIGURE 1, but modified to receive alternate forms of snap-rings illustrated in FIGURES 10–13.

In FIGURES 10 to 13, the external and internal radial, integral keys 34, 33 (37, 36) on the rings 32 (35) are shown. The inclusion of this combination of ring and key in an assembly is shown in FIGURE 22. A longitudinal channel 38 is enlarged to receive the inner key 33, until the ring 32 snaps into the groove 15.

Figure 16:
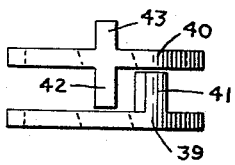
FIGURE 16 is a top plan view of a pair of locking devices, one having a perpendicular key on one side and the other having perpendicular keys extending on opposite sides.
Figure 17:
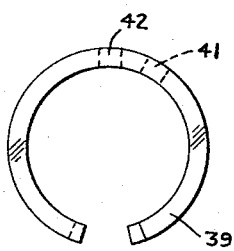
FIGURE 17 is a side elevational view of the device shown in FIGURE 16.

The combination of snap-rings 39, 40 in FIGURES 16, 17 is utilized if the outer part 11 is relatively narrow walled. The snap ring 39 in the combination is the same as the one shown in FIGURES 6 and 7, although in FIGURE 16 leg 41 is shortened. The snap-ring 40 has biaxial keys 42, 43.

Figure 18:
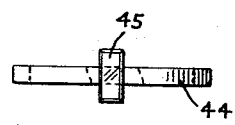
FIGURE 18 is a top plan view of a bilateral, biradial locking device, having the key extending on opposite sides of the device and extending above and below the external and internal peripheral surfaces of the top and bottom of the device.
Figure 19:
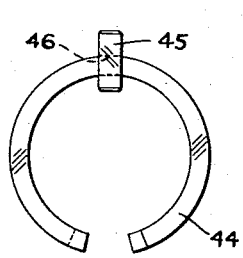
FIGURE 19 is a side elevational view of the device shown in FIGURE 18.
Figure 20:
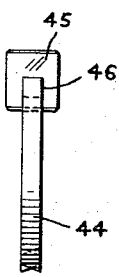
FIGURE 20 is an end elevational view of the device shown in FIGURES 18 and 19.

The snap-ring 44 shown in FIGURES 18, 19 and 20 is provided with a leg 45 which extends both radially and axially from the ring 44. The key 45 may be formed integral with the ring 44, but it will be less expensive to make it separate, provide it with an operative 46 dimensioned to receive the ring 44, and to slide it on until it reaches a position as shown in the figures.

The numerous species of rings illustrate the versatility of the lock. Where great torsional shock resistance is required, the long axial keys are most suitable which are longer and more numerous. They may be either separate or integral. Where the axial forces to be overcome are slight, a single snap-ring with integral or separate key or keys can be selected. Where the member with the passage is thin, a snap-ring with a single short axial key may be used. Where the torsional force to be resisted is great and the wall of the member having the passage is thin, the snap-ring chosen may have biaxial and biradial enlargements to function as the key.

Figure 21:
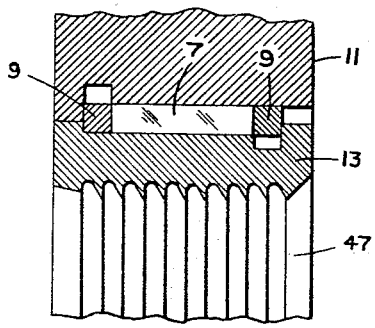
FIGURE 21 shows an application of a locking device to the external surface of a cylindrical object to engage it in the internally cylindrical passage of another object.

FIGURE 21 illustrates a lock wherein the inner member has a bore 47 suitable to receive any desired insertable object by threaded engagement, frictional engagement with serations, or otherwise.

The foregoing description is intended to be illustrative of one embodiment of the invention, as many changes may be made in the selection, instruction and arrangement of the parts within the scope of the claim without departing from the spirit of the invention.

What is claimed:

A lock comprising:
(a) A first member having an internal passage with a flared entrance;
(b) a second member having a portion of its external surface dimensioned to fit into the internal passage and a tapered front end;
(c) the first and second members each having a pair of arcuate, radial, snap-ring grooves, and at least one axial key groove in the internal passage and on the external surface;
(d) a key slidable in and substantially the height of both axial key grooves;
(e) the snap-ring groove at the rear of the second member dimensioned to entirely receive a first snap-ring;
(f) the snap-ring groove at the front of the first member dimensioned to entirely receive a second snap-ring;
(g) the snap-ring groove at the front of the second member and the snap-ring groove at the rear of the first member dimensioned to receive a snap-ring only partly;
(h) resilient, deformable snap-rings partially seated in the grooves at the rear of the second member and at the front of the first member with the key between them;
(i) the snap-rings deformable by the tapered front end and the flared entrance, to be cammed firstly into the complete entry into the said full dimensioned grooves, and secondly to snap partly into the opposite groove at the front of the second member and at the rear of the first member, when the opposing grooves are brought into registration with each other by the relative axial movement of the first and second members.

References Cited

UNITED STATES PATENTS

| 502,686 | 8/1893 | Tilton. |
| 738,503 | 9/1903 | Waters. |
| 1,208,541 | 12/1916 | Golby _____ 287—52 X |
| 1,809,404 | 6/1931 | Culbertson. |
| 2,332,270 | 10/1943 | Shaw _____ 287—52.05 |
| 2,509,081 | 5/1950 | Bluth et al. |
| 2,749,162 | 6/1956 | Humphrey. |
| 2,813,732 | 11/1957 | Hird. |
| 3,282,614 | 11/1966 | Entrikin _____ 285—421 X |

FOREIGN PATENTS

| 649,440 | 1/1951 | Great Britain. |

CARL W. TOMLIN, *Primary Examiner.*

THOMAS F. CALLAGHAN, *Examiner.*